3,142,535
PROCESS FOR THE PURIFICATION OF HYDROGEN CHLORIDE GAS CONTAMINATED WITH PHOSGENE
Frank J. Christoph, Jr., North East, Md., assignor to E. I. du Pont de Nemours and Company, Wilmington, Del., a corporation of Delaware
No Drawing. Filed Aug. 16, 1962, Ser. No. 217,300
5 Claims. (Cl. 23—154)

This invention relates to a process for purifying hydrogen chloride and more particularly to a process for the removal of relatively small quantities of phosgene from hydrogen chloride gas.

Materials produced by the reaction of phosgene with amino groups or hydroxyl groups are of increasing commercial importance. In processes involving these types of reactions, hydrogen chloride gas is produced as a by-product. The by-product hydrogen chloride usually is contaminated with more or less phosgene which often interferes with its further use. For example, the presence of phosgene in hydrogen chloride gas interferes in the preparation of ethyl chloride from ethyl alcohol. Likewise, by-product hydrogen chloride containing phosgene has been found unacceptable for use in the preparation of chloroprene from vinylacetylene. While large quantities of phosgene may be easily removed from hydrogen chloride by refrigeration or solvent stripping, the last traces of this contaminant are difficult to remove. It is true that the last traces of phosgene may be removed from hydrogen chloride by absorbing the contaminated gas in water and revaporizing the hydrogen chloride from the concentrated solution of hydrochloric acid which is formed. However, this process is expensive to operate, requires a large amount of expensive acid resistant equipment and produces a wet hydrogen chloride gas which is not acceptable for many uses.

It is an object of the present invention to provide a process for the purification of hydrogen chloride. A further object is to provide a process for removing phosgene from hydrogen chloride gas. A still further object is to provide an economical process for purifying hydrogen chloride gas so that the gas is acceptable for use in the manufacture of chloroprene and ethyl chloride. Other objects will appear hereinafter.

These and other objects are accomplished by a process for removing phosgene from a gaseous mixture comprised of hydrogen chloride and phosgene, which process comprises intimately contacting the gas mixture at a temperature of from about 0 to 100° C. with a liquid alcohol selected from the group consisting of aliphatic hydrocarbon primary alcohols and aliphatic hydrocarbon secondary alcohols.

Removal of phosgene by the process of the present invention is based upon the reaction of alcohols with phosgene to form chloroformates as shown by the following equation:

In this equation, R may be either an aliphatic hydrocarbon primary or a secondary radical. In the presence of excess alcohol, the initial reaction product may react further with an additional mole of alcohol to form a carbonate ester as shown below:

In this equation, R has the same meaning as that described above.

The process of the present invention finds its greatest use in the purification of contaminated hydrogen chloride containing about 1% phosgene or less by weight. In general, other processes will be found to be more economical for removing the bulk of phosgene present in gas mixtures containing more than 1% phosgene. Contaminated hydrogen chloride to be purified by the process of the present invention may also contain other gases or vapors in addition to phosgene, as long as these other components do not react with the alcohol employed to effect the purification. For example, gases such as carbon monoxide, nitrogen and hydrogen may be present. Inert organic vapors such as those of carbon tetrachloride, toluene, xylene, monochlorobenzene, and orthodichlorobenzene may also be present. It is obvious that the process of the present invention may be employed to remove phosgene from gases other than hydrogen chloride; however, it should be noted that the purified gas will be contaminated with hydrogen chloride. Naturally the production of hydrogen chloride as a by-product of the purification reaction does not interfere when hydrogen chloride is the gas being decontaminated.

Any aliphatic hydrocarbon alcohol containing a primary or secondary hydroxyl group, which is liquid under the operating conditions of the process, may be employed in the purification of the present invention. The alcohols having from 2 to 12 carbon atoms are preferred. Aliphatic alcohols containing tertiary hydroxyl groups are not suitable for use in the present invention because of their tendency to react with hydrogen chloride to produce alkyl chlorides. Since secondary alcohols may also show this tendency to a slight degree, primary alcohols are definitely preferred. Representative examples of suitable primary aliphatic alcohols include ethyl alcohol, n-butanol, n-octanol, n-decanol and n-dodecanol. Even higher alkyl aliphatic alcohols may be employed, but operation at elevated temperatures may be required to keep these alcohols in a liquid state. The mixtures of isomeric primary octyl alcohols and isomeric primary decyl alcohols which are produced by the Oxo process are particularly useful in the process of the present invention. These isomeric mixtures, which are often called iso-octyl alcohol and iso-decyl alcohol, are readily available and relatively inexpensive. They have the additional advantage of being high boiling; for example, the boiling point of the mixture of decyl alcohol isomers is about 215° C. The high boiling point of these alcohols limits the amount of contamination of the purified hydrogen chloride by alcohol vapors. Additional information on the Oxo process and the alcohols which may be produced by it may be found in Groggins, "Unit Processes in Organic Synthesis," Fifth Edition, McGraw-Hill, 1958, pages 678–691. Representative examples of secondary aliphatic alcohols which may be used in the process of the present invention include isopropanol, butanol-2, octanol-2 and decanol-2. In addition to the monohydric alcohols listed above, dihydric and polyhydric aliphatic alcohols, including compounds such as ethylene glycol, diethylene glycol, diacetone alcohol and glycerine, may be used to remove phosgene from hydrogen chloride gas. If it is desirable for any reason, mixtures of any of the above types of alcohol may be used.

Any contacting device that gives good gas-liquid contact can be used to carry out the process of the present invention. This includes packed towers, sieve plate or bubble plate columns and vigorously agitated vessels. Packed towers and the different types of columns that may be used are normally operated in a countercurrent fashion; that is, the alcohol is passed down the column while the hydrogen chloride to be purified is passed upward. The reaction of phosgene with the alcohol proceeds with sufficient rapidity that co-current pipeline reactors may also be used to advantage. The process may be carried out in all of the types of equipment suggested in either a batch-wise fashion or continuously. In operating batch-wise, a sufficient quantity of alcohol to operate the recirculation system of a column or tower or to fill a batch agitated reactor vessel is added and passage of contaminated hydrogen chloride is started and continued until most of the alcohol is converted to chloroformates or carbonate esters. At this point, the flow of hydrogen chloride is stopped, spent alcohol is discharged, fresh alcohol is added and the flow of hydrogen chloride is resumed. All of the systems may be run continuously by introducing fresh alcohol at a rate slightly greater than that at which alcohol is consumed, while simultaneously withdrawing an appropriate quantity of spent alcohol to maintain the correct volume in the reactor. Continuous operation offers several advantages including freedom from shut-downs, a more uniform purified hydrogen chloride and more efficient equipment utilization. The choice of equipment and the fashion in which the process is operated depend to a large extent on the flow rates of gas, the initial phosgene concentration and the final phosgene concentration desired in the purified hydrogen chloride. The process is capable of removing phosgene down to levels of at least less than 1 p.p.m., the limit of the final concentration being largely dependent on the interfacial area and time of contact of the gas with the liquid in the reactor. The final concentration of phosgene also depends on the specific alcohol employed and the degree of utilization of the alcohol.

As indicated by the equations presented above, at least 1 mole of monohydric alcohol is required for each mole of phosgene to be removed. In the case of di- and polyhydric alcohols, one equivalent of hydroxyl group is required for each mole of phosgene to be removed. In actual practice, a somewhat larger quantity of alcohol is required to allow for the reaction of chloroformate with excess alcohol to produce a minor amount of carbonate ester. Losses of alcohol may also be experienced by carrying off alcohol vapors in the purified hydrogen chloride gas stream. This latter loss is not highly significant in the case of high boiling alcohols; however, it may become appreciable in the case of low boiling alcohols such as ethyl alcohol. An additional factor which must be considered in determining the excess of alcohol to be employed is the effect on rate caused by diluting the alcohol with phosgene-alcohol reaction products. While alcohol concentrations as low as 1 mole percent, either in inert solvents or in alcohol-phosgene reaction products, are still effective for removing phosgene, it is generally preferred to have an alcohol concentration of 5–10 mole percent in the medium being employed to react with the phosgene. Thus, at least 1.05–1.10 moles of a monohydric alcohol are preferred for every mole of phosgene to be absorbed. It is surprising that the alcohol may be used so effectively in this process, for as previously indicated, it is possible for the initially formed chloroformate to react further with alcohol to produce carbonate esters. Fortunately, it has been found that the rate of this second reaction is negligible at operating temperatures below about 100° C. and phosgene removal generally can be accomplished at temperatures ranging from 0 to 100° C. as long as the alcohol used is in the liquid state. The preferred temperature range is about 20–50° C. with the preferred iso-octyl and iso-decyl alcohols. Under these temperature conditions, the rate of the phosgene-alcohol reaction is great enough that phosgene may be removed efficiently to very low levels. At the same time, the carbonate ester reaction does not proceed at an appreciable rate and vapor losses of alcohol to the purified hydrogen chloride stream are not excessive. Other alcohols differing radically in boiling point or in reactivity may require adjustments of temperature to obtain maximum efficiency of operation.

While the process of the present invention may be operated at subatmospheric pressures, operation at atmospheric pressure or at superatmospheric pressures is definitely preferred. Superatmospheric operation reduces the size of contacting equipment required, increases the efficiency of gas-liquid contact and minimizes the loss of alcohol vapors into the purified hydrogen chloride stream. Operation in the region of 3–10 atmospheres' pressure is especially preferred since it offers the advantages mentioned above and does not require equipment which is excessively heavy in design.

The reaction between phosgene present in hydrogen chloride gas and alcohols may also be performed in the vapor phase especially if low boiling alcohols are employed. In general, this type of purification is not preferred because the purified hydrogen chloride contains vapors of excess alcohol and phosgene-alcohol reaction products. If the presence of these materials in the hydrogen chloride is undesirable, they may be removed by contacting the hydrogen chloride, subsequent to the alcohol treatment, with a very high boiling oil which will absorb the organic vapors. Even in the case of hydrogen chloride purified by liquid phase treatment with a high boiling alcohol, the oil absorption technique may be of use to remove minute traces of organic vapors. In general, however, the additional step of oil absorption is not required to produce hydrogen chloride gas which is acceptable for most uses.

Traces of phosgene in hydrogen chloride gas may be determined most conveniently by measuring absorption in the infrared at about 5.5 microns and comparing with a calibration curve based on known mixtures of phosgene in hydrogen chloride. By increasing the light path through the gas sample or by pressuring the gas sample, as little as about 1 p.p.m. of phosgene can be detected in hydrogen chloride free from interfering substances.

The following examples will better illustrate the nature of the present invention; however, the invention is not intended to be limited to these examples. Parts are by weight unless otherwise indicated.

*Example 1*

About 480 parts of iso-decyl alcohol, synthesized by the Oxo process, are placed in glass-lined reactor having a liquid-full capacity of 1660 parts of iso-decyl alcohol. The reactor is equipped with a high-speed agitator and baffles so that the alcohol may be vigorously agitated. The vessel is also equipped with a gas inlet tube for feeding gas directly under the impellor of the agitator, and a gas outlet. Agitation is started in the reactor and hydrogen chloride gas containing 1000 p.p.m. of phosgene is introduced through the gas inlet below the agitator at a rate of 2 parts/minute. The pressure at which the hydrogen chloride is fed to the system is only sufficient to overcome pressure drop in the gas lines and the hydrostatic head caused by the alcohol. The temperature of the alcohol in the reactor is maintained at 25–30° C. while hydrogen chloride is being introduced. The flow of hydrogen chloride through the reactor is continued for an hour and a sample of the gas issuing from the reactor is analyzed for phosgene. No phosgene can be detected in the treated hydrogen chloride by means of infrared analysis with equipment having a limit of about 1 p.p.m. phosgene.

*Example 2*

About 500 parts of anhydrous ethyl alcohol are placed in a glass-lined agitated pressure reactor (similar in arrangement to that described in Example 1) having a liquid-full capacity of 800 parts ethyl alcohol. Agitation is started and hydrogen chloride gas containing about 5000 p.p.m. of phosgene is introduced under pressure at a rate of 20 parts/minute. Treated hydrogen chloride is removed from the reactor at a rate such that a pressure of 150 p.s.i.g. exists in the reactor. The temperature in the reactor is maintained at about 20° C. while hydrogen chloride is being introduced. After the passage of hydrogen chloride has continued for about 2 hours, a sample of the exit gas is analyzed for phosgene by the procedure described in the specification. Infrared analysis shows the presence of 1 p.p.m. phosgene, which is about the limit of the analytical method.

Example 3

Iso-decyl alcohol produced by the Oxo process is recirculated through a packed tower 1 foot in diameter and 20 feet in height (packed with 1" ceramic Raschig rings) at a rate of about 2040 lb./hr. The flow of alcohol in the column is from top to bottom. Hydrogen chloride gas containing about 300 p.p.m. of phosgene is passed counter-current to the flow of alcohol at a rate of about 2040 lb./hr. The hydrogen chloride is fed to the bottom of the tower and vented from the top of the packed tower at rates such that the pressure within the tower is maintained at 75 p.s.i.g. A pressure of 75 p.s.i.g. also exists over the recirculating alcohol stream. The temperature within the tower is maintained at about 20° C. by adding or removing heat as required from the recirculating alcohol. Impure hydrogen chloride is passed through the column until the concentration of iso-decyl alcohol in the recirculating liquid stream drops to about 10 percent by weight. The remainder of the stream represents alcohol-phosgene reaction products. At this point, the continuous addition of fresh alcohol is started at a rate of about 1.2 lb./hr. and simultaneously, removal of about 1.6 lb./hr. of liquid reaction products is started. These rates of addition and removal maintain essentially a constant amount of alcohol in the system at a concentration of about 10 percent by weight dissolved in alcohol-phosgene reaction products. The molar ratio of alcohol to phosgene is about 1.23:1.0. Under these equilibrium conditions, with the flow of hydrogen chloride being maintained at 2040 lb./hr., the gas issuing from the top of the column is found to contain 5 p.p.m. phosgene by infrared analysis. The gas is suitable for use in the preparation of chloroprene by addition to vinylacetylene.

As many widely different embodiments of this invention may be made without departing from the spirit and scope thereof, it is to be understood that this invention is not limited to the specific embodiments thereof except as defined in the appended claims.

What is claimed is:

1. A process for removing phosgene from a gaseous mixture comprised of hydrogen chloride and phosgene, which comprises intimately contacting at a temperature of from about 0 to 100° C. said gaseous mixture with a liquid alcohol selected from the group consisting of aliphatic primary and secondary alcohols, the amount of alcohol being sufficient to supply at least 1.05 equivalent of hydroxyl groups for each mole of phosgene.

2. A process for removing phosgene from a gaseous mixture comprising hydrogen chloride and not more than about 1 percent by weight of phosgene, which comprises intimately contacting at a temperature of from about 0 to 100° C. said gaseous mixture with a liquid alcohol selected from the group consisting of aliphatic primary and secondary alcohols, the amount of alcohol being sufficient to supply at least 1.05 equivalent of hydroxyl groups for each mole of phosgene.

3. The process of claim 2 wherein the gaseous mixture is contacted with the liquid alcohol under a pressure of from 3 to 10 atmospheres.

4. The process of claim 3 wherein the alcohol is iso-decyl alcohol.

5. The process of claim 3 wherein the alcohol is ethyl alcohol.

References Cited in the file of this patent

J. W. Mellor's "A Comprehensive Treatise on Inorganic and Theoretical Chemistry," vol. 5, 1924 Ed., page 967, and Supp. II, part 1, 1956 Ed., page 423. Longmans, Green and Co., N.Y.

"Condensed Chemical Dictionary," 3rd Ed., page 349 (1942 Ed.), Reinhold Pub. Corp., N.Y.